Aug. 24, 1943.  A. L. PARKER  2,327,449
CONDUIT FITTING
Filed Dec. 14, 1940
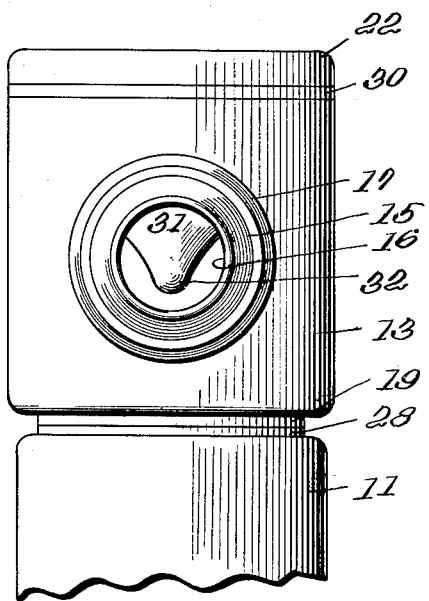
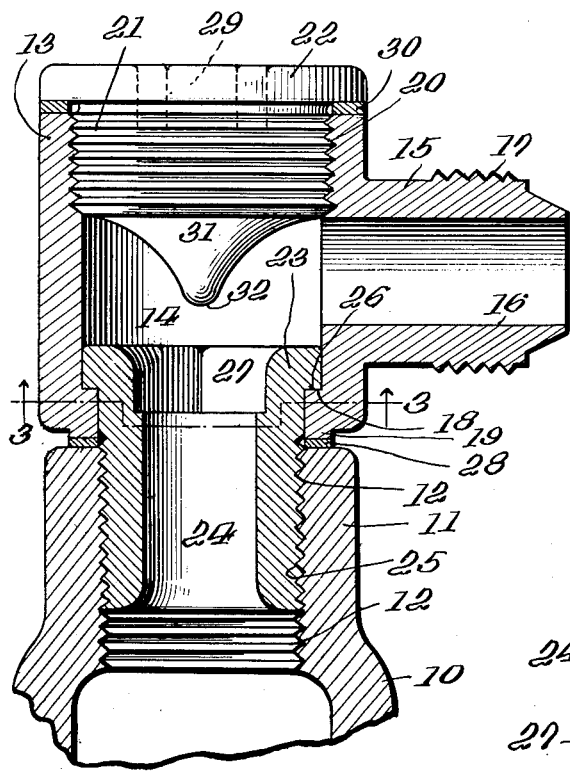
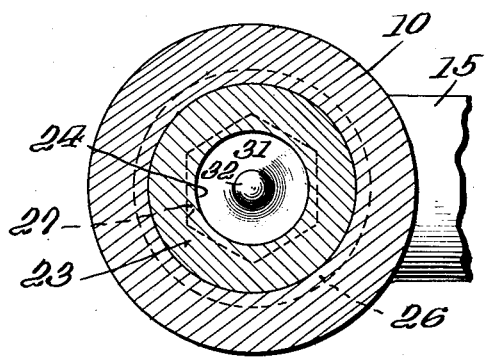
INVENTOR
Arthur L. Parker
Mason & Porter
ATTORNEYS Patented Aug. 24, 1943

2,327,449

UNITED STATES PATENT OFFICE 2,327,449

CONDUIT FITTING

Arthur L. Parker, Cleveland, Ohio

Application December 14, 1940, Serial No. 370,214

1 Claim. (Cl. 138—37)

The present invention relates to new and useful improvements in a conduit fitting, and more particularly to improvements in a coupling or connector for joining tubes, pipes, hose or other fluid conduits.

In constructing fluid distributing systems or in connecting extensions to fluid systems, it is often necessary to connect conduits which are disposed at an angle relative to one another. Rather than attempt to bend the conduits and connect them with a simple form of coupling, it is customary to employ an angle fitting having angularly disposed conduit adapters which may be shifted relative to one another so that the fluid conduits can be conveniently coupled together. However, with such fittings, it has been found that the flow characteristics of the fluid through the fitting may be seriously altered to such an extent that the free flow of fluid therethrough is materially impaired with the result that there is a considerable pressure drop.

An object of the present invention is to provide a conduit fitting of the above type which is constructed and arranged so as to maintain a substantially free flow of fluid therethrough regardless of the relative angular position of the conduit adapters.

A further object of the invention is to provide a conduit fitting of the above type having therein a gradually curved surface which is positioned so as to maintain a substantially free and smooth flow of fluid regardless of the direction in which the fluid passes through the fitting.

The invention still further aims to provide a conduit fitting of the above type which is relatively simple in construction and which may be assembled in such a manner that strains thereon are substantially reduced.

The above and other objects of the invention will in part be obvious and will be hereinafter more fully pointed out.

In the accompanying drawing:

Figure 1 is a longitudinal sectional view of the fitting but showing the closing plug or cap in elevation.

Figure 2 is a side elevation of Figure 1.

Figure 3 is a sectional view taken along the line 3—3 of Figure 1.

Referring more in detail to the accompanying drawing, the fitting is illustrated as being attached to a boss 11 which is internally threaded, as at 12. The boss 11 may form a part of a fluid conduit or a tank, reservoir or the like. The fitting includes a body portion or casing 13 which is provided with an internal chamber 14 open at both ends and with one or more conduit adapters 15. The side adapter 15 is provided with a longitudinal bore 16 which is in communication with the chamber 14 and the adapter may be externally threaded, as at 17, so as to facilitate the securing thereof to a tube or pipe line. Below the side conduit or adapter 15, the body portion is shaped to provide an inwardly extending transverse shoulder 18 and a depending external shoulder portion 19. The upper end of the body portion 13 above the side conduit is provided with an internal threaded portion 20 to receive the external threads 21 on a closing plug 22.

In assembling the fitting, a bolt 23 in the form of a coupling sleeve is inserted within the chamber 14 before the plug 22 is applied. The coupling sleeve or bolt 23 is provided with a longitudinal bore 24 and with an externally threaded portion 25 which is adapted to engage the threads 12 on the boss 11. The upper edge of the bolt 23 is provided with an outwardly extending transverse shoulder 26 which is adapted to cooperate with the shoulder 18 on the body portion 13. The shoulder 23 is counter-sunk, as at 27, and is shaped to provide an internal hexagonal surface into which a suitable tool may be inserted. A washer 28 is disposed between the end of the boss 11 and the depending shoulder 19 on the body portion so as to provide a fluid tight seal when the parts are tightened relative to one another.

After the bolt 23 becomes threadedly engaged with the boss 11 but before tightening thereof, the entire body portion 13 may be rotated around the longitudinal axis of the bolt and the conduit 10 so as to properly position the adapter 15 for engagement with a tube or pipe line. When properly positioned, the bolt 23 is tightened so as to securely clamp the body portion or housing 13 relative to the conduit 10 and in this connection, it will be noted that the only strain incident to tightening of the fitting relative to the conduit 10 is effected between the shoulders 19, 26. After the fitting has been thus positioned, the closing plug or cap 22 may be applied so as to close the upper end of the housing 13. For this purpose, the cap 22 is also provided with a recessed hexagonal portion 29 by means of which it may be tightened by a suitable form of tool. A washer 30 is disposed between the inner surface of the plug 22 and the upper end of the housing 13 so as to provide a fluid tight seal.

The inner end of the cap 22 is shaped to provide a substantially coniform projection 31 having the apex end 32 thereof extending toward the bolt or sleeve 23 but terminating short thereof. The end 32 of the projection may be pointed or rounded, as illustrated. The center longitudinal axis of the projection 31 is illustrated as coinciding with the central axis of the plug 22 and as substantially coinciding with the longitudinal center axis of the passage 24 through the sleeve 23. The projection 31 extends away from the threaded part of the plug 22 with the center axis thereof following a diameter of the passage 16 but terminating short of the opposite end thereof. Thus, the end 32 of the projection is spaced inwardly of the casing from the end of the passage 16 and is disposed substantially centrally of the passage 16 although extending slightly beyond the central axis thereof toward the sleeve. The surface of the projection 31 is uniformly and gradually curved to provide a peripheral concave surface the base of which originates substantially at the end of the threaded portion 21 on the plug 22. The end of the plug 22 is substantially in line with the adjacent wall of the passage 16. It will be seen, therefore, that the end portion of the projection 31 covers an area where the central axes of the fluid passages 16, 24 intersect within the chamber 14 so that the projection is disposed in the path of fluid which passes through the chamber 14 between the fluid passages. In some instances, it may be desirable to provide a straight-through passage for at least a portion of the fluid and in this case, the plug 22 can be omitted and replaced by an additional conduit.

In the usual angle fittings of this type, the free flow of fluid through the casing is impaired so that a considerable pressure drop often results. In such fittings, when fluid passes from the conduit 10 through the passage 24 and outwardly through the passage 16, there is a tendency for the main stream of fluid to flow directly against the cap or other surface which is opposed to the passage 24 and this results in a reversal of flow of this part of the fluid. This reversing of the fluid causes it to be directed back into the path of the incoming fluid so that the fluid is violently agitated and scattered in all directions. This action of the fluid reduces the smooth and free flow of fluid through the fitting and often results in an undesirable pressure drop. Substantially the same conditions exist when the fluid enters the casing through the passage 16 and is delivered through the conduit 10. However, according to the present invention, the disposition of the projection 31 is such that it will improve the flow characteristics of the fluid through the fitting. Where the fluid enters through the passage 24, a large portion of the fluid will be diverted by the curved surface of the projection 31 and directly into the passage 16 although a portion of the fluid will be directed toward the side wall of the casing. However, the portion of the fluid which is directed against the side wall of the casing will in turn be directed back toward the center thereof and in the direction of the fluid passing outwardly through the passage 16 so that there is a tendency for this fluid to flow along with the main stream which has been diverted directly into the passage 16. In this manner, all of the fluid is caused to flow in the proper direction, that is, outwardly through the passage 16 and this results in a substantially free flow of fluid through the fitting so as to prevent any substantial pressure drop. When the passage of fluid through the fitting is reversed with the fluid entering through the passage 16 and being discharged through the conduit 10, a large portion of the fluid striking the adjacent curved surface of the projection 31 will be diverted directly into the passage 24. A part of the fluid will, of course, be directed against the side wall of the casing and this in turn will be directed back against other parts of the projection 31 so that this fluid will also be directed toward the passage 24.

From the foregoing description, it will be seen that the present invention provided an angle fitting for joining fluid conduits where it is necessary to change the direction of flow of the fluid and this fitting is constructed and arranged so as to substantially maintain the free and smooth flow of fluid through the fitting in order to prevent any substantial pressure drop which is often caused by constant backing-up of fluid in the casing. The base of the projected portion 31 merges into the end of the threaded part 21 of the plug 22 entirely around the same so that the plug 22 does not have to assume any predetermined set position. Thus, a concave surface is always disposed in the path of fluid regardless of the direction of flow of the fluid through the fitting.

While one form of the invention has been shown for purposes of illustration, it is to be clearly understood that minor changes in the details of construction and arrangement of parts may be made without departing from the scope of the invention as set forth in the appended claim.

I claim:

A fitting for fluid conduits comprising a body portion having a cylindrical chamber open at its ends and a radial extension provided with a port connected to the chamber, said body portion having an inwardly extending shoulder adjacent one end, a sleeve fitted within said chamber and engaging said shoulder and projecting beyond the end and having threaded connection with the fluid conduit, a gasket between the end of said body portion and the fluid conduit, said sleeve being adapted to secure said body portion in a selected fixed position on said conduit, a plug having a threaded connection with the opposite end of said body portion for closing the upper end of the chamber, said plug extending into the chamber to a point adjacent the port in the radial extension and having a substantially coniform projection curved so as to direct fluid from the conduit into the radial port, the inner wall of said sleeve at the upper end thereof being curved to conform to the curvature of the opposing surface of the plug.

ARTHUR L. PARKER.